US012584524B2

(12) United States Patent
Huot-Marchand et al.

(10) Patent No.: US 12,584,524 B2
(45) Date of Patent: Mar. 24, 2026

(54) ROLLING-ELEMENT BEARING WITH SEALS AND PURGING CHANNEL

(71) Applicant: AKTIEBOLAGET SKF, Gothenburg (SE)

(72) Inventors: Marie-Joelle Huot-Marchand, Diges (FR); Vincent Bredoire, Pourrain (FR)

(73) Assignee: AKTIEBOLAGET SKF, Gothenburg (SE)

( * ) Notice: Subject to any disclaimer, the term of this patent is extended or adjusted under 35 U.S.C. 154(b) by 152 days.

(21) Appl. No.: 18/530,351

(22) Filed: Dec. 6, 2023

(65) Prior Publication Data

US 2024/0200606 A1 Jun. 20, 2024

(30) Foreign Application Priority Data

Dec. 20, 2022 (DE) .......................... 102022214026.5

(51) Int. Cl.
*F16C 33/78* (2006.01)
*F16C 33/72* (2006.01)

(52) U.S. Cl.
CPC ........ *F16C 33/7896* (2013.01); *F16C 33/726* (2013.01); *F16C 33/7886* (2013.01); *F16C 2300/14* (2013.01)

(58) Field of Classification Search
CPC .............. F16C 33/6622; F16C 33/6677; F16C 33/6685; F16C 33/726; F16C 33/7823;
(Continued)

(56) References Cited

U.S. PATENT DOCUMENTS 3,019,065 A * 1/1962 Neeley ................. H02K 5/1732
384/473
4,395,140 A 7/1983 Sable
(Continued)

FOREIGN PATENT DOCUMENTS

CN 104895726 A * 9/2015 .............. F16C 33/76
DE 3742079 A1 6/1989
(Continued)

OTHER PUBLICATIONS

Machine Translation of CN-104895726-A (Year: 2015).*
(Continued)

*Primary Examiner* — Alan B Waits
(74) *Attorney, Agent, or Firm* — J-TEK LAW PLLC; Scott T. Wakeman; Mark A. Ussai

(57) ABSTRACT

A rolling-element bearing includes first and second concentric ring assemblies and rolling elements supporting the ring assemblies for relative rotation. The first ring assembly includes a first rolling ring and a first sealing ring mounted axially to the first rolling ring and supporting a first seal element and a second seal element, and the second ring assembly includes a second rolling ring and a second sealing ring mounted axially to the second rolling ring. The first seal element includes a first lip in contact with the second sealing ring and the second seal element includes a second lip in contact with the second sealing ring, the first and second lips delimiting a first chamber between the first and second sealing rings, A first purging channel extends from an inlet at the first chamber to at least one outlet in at least one external surface of the second rolling ring.

13 Claims, 9 Drawing Sheets

(58) Field of Classification Search
CPC ................ F16C 33/783; F16C 33/7886; F16C 33/7896; F16C 2300/14; F03B 3/14; F03B 11/06; F03B 15/00
See application file for complete search history.

(56) References Cited

U.S. PATENT DOCUMENTS

| | | | |
|---|---|---|---|
| 9,022,663 B2 * | 5/2015 | Palmer | F16C 33/7896 384/473 |
| 9,334,901 B2 * | 5/2016 | Schröppel | F03B 17/061 |
| 10,731,707 B2 | 8/2020 | Baumann et al. | |
| 11,022,176 B2 | 6/2021 | Delaby et al. | |
| 11,371,613 B2 | 6/2022 | Mandou et al. | |
| 11,486,444 B2 | 11/2022 | Capoldi et al. | |
| 2013/0039611 A1 * | 2/2013 | Russ | F16C 19/381 384/486 |
| 2014/0191508 A1 | 7/2014 | Schröppel et al. | |
| 2014/0346738 A1 | 11/2014 | Rusch et al. | |
| 2016/0341316 A1 * | 11/2016 | Baumann | F16J 15/3232 |
| 2019/0011050 A1 | 1/2019 | Vincent et al. | |
| 2019/0323559 A1 | 10/2019 | Delaby et al. | |
| 2021/0140482 A1 * | 5/2021 | Capoldi | F16C 33/586 |
| 2022/0341543 A1 | 10/2022 | Kreutzkaemper et al. | |
| 2024/0200606 A1 | 6/2024 | Huot-Marchand et al. | |

FOREIGN PATENT DOCUMENTS

| | | |
|---|---|---|
| DE | 102009021322 A1 | 12/2010 |
| DE | 102011016185 B4 | 10/2012 |
| EP | 2806190 B1 | 3/2017 |
| EP | 2694831 B1 | 6/2019 |
| GB | 2573194 A | 10/2019 |
| WO | 2010040027 A2 | 4/2010 |

OTHER PUBLICATIONS

European Search Report from the European Patent Office dispatched May 13, 2024 in related application No. 23216754.4.
Unpublished U.S. Appl. No. 18/530,365, Matthias Hofmann, filed Dec. 6, 2023.
Unpublished U.S. Appl. No. 18/530,379, Marie-Joelle Huot-Marchand, filed Dec. 6, 2023.
Unpublished U.S. Appl. No. 18/530,412, Marie-Joelle Huot-Marchand, filed Dec. 6, 2023.

* cited by examiner

ROLLING-ELEMENT BEARING WITH SEALS AND PURGING CHANNEL

CROSS-REFERENCE

This application claims priority to German patent application no. 10 2022 214 026.5 filed on Dec. 20, 2022, the contents of which are fully incorporated herein by reference.

TECHNOLOGICAL FIELD

The present disclosure is directed to the field of rolling-element bearings, and, more specifically, to the field of large-diameter rolling-element bearings having an inner ring and an outer ring arranged concentrically about an axis of rotation running in an axial direction and at least one purging channel.'

BACKGROUND

Such large-diameter rolling-element bearings may be used for example in marine applications, for example in a tidal or marine turbine power station or in a tunnel boring machine or in a mining extraction machine or in a wind turbine.

A large-diameter rolling-element bearing generally comprises two concentric inner and outer rings and at least one row of rolling elements, such as rollers or balls, arranged between the rings. The bearing also comprises seals disposed between the inner and outer rings to define a closed space inside which the rolling elements are arranged.

Large-diameter rolling-element bearings are generally used in aggressive environments, in particular in marine applications. Seals prevent exterior elements, such as dust, abrasive particles, water and marine species, for example plankton and algae, from getting inside the bearing and damaging its components. Those exterior elements may also alter the seal itself, leading to a reduction in the seal service life.

Generally, a plurality of additional adjacent seals is provided on the bearing front side which is directly in contact with the aggressive environments, for example with the saltwater. These additional seals are fixed to a sealing ring of one of the inner and outer rings and comprise a sealing lip in sliding contact with a running surface of a sealing ring of the other ring. Hence, several adjacent closed outer chambers are delimited between the sealing lips of the adjacent seals.

If water starts to enter inside the rolling-element bearing, by first entering inside the first outer seal chamber, it is desired to prevent the water or contamination from moving further inside the bearing and reaching the rolling space.

This water ingress problem can occur in many applications, but it is a particular problem for immersed applications such as in tidal turbines.

SUMMARY

One aim of the present disclosure is to overcome this drawback.

The disclosure relates to a rolling-element bearing comprising a first ring assembly and a second ring assembly configured to rotate concentrically relative to one another, and at least one row of rolling elements arranged between first and second raceways of the first and second ring assemblies.

The first ring assembly comprises at least one first rolling ring provided with the first raceway and at least one first sealing ring secured to the first rolling ring. The second ring assembly comprises at least one second rolling ring provided with the second raceway and at least one second sealing ring secured to the second rolling ring.

The rolling-element bearing further comprises at least first and second successive seal elements supported by the first sealing ring of the first ring assembly and each provided with at least one sealing lip coming into contact with the second sealing ring of the second ring assembly, the sealing lips of the first and second successive seal elements delimiting between the first and second sealing rings a first chamber.

According to a general feature, at least a first purging channel extends through the second ring assembly and comprises at least one inlet orifice opening into the first chamber and at least one outlet orifice opening on an external surface of the second ring assembly which is accessible from the outside of the rolling-element bearing.

Thanks to the disclosure, in case some fluid such as water enters the first sealed chamber, it is evacuated through the first purging channel until the outlet orifice(s). This leads to optimize sealing performance of the first and second successive seal elements and to avoid to change these seal elements too often.

The fluid can circulate through the first purging channel thanks to the gravity force and/or under the effect of a pump connected to the outlet orifice(s).

In one embodiment, the first purging channel extends through the second sealing ring and the second rolling ring of the second ring assembly, and the surface onto which the outlet orifice of the first purging channel opens is located on the second rolling ring.

Alternatively, the first purging channel may only extend through the second sealing ring of the second ring assembly. In this case, the surface onto which the outlet orifice of the first purging channel opens is located on the second sealing ring.

In one embodiment, the rolling-element bearing further comprises at least one closing element removably attached at the outlet orifice of the first purging channel.

Preferably, the closing element is made of transparent material so that one can visually detect the presence of contaminant fluid during an inspection of the bearing. In such case, the closing element can be removed and placed back in position after the fluid has been purged.

The closing element may be a plug. Alternatively, the closing element may be a collector to collect fluid.

The rolling-element bearing may further comprise at least a third seal element supported by the first sealing ring of the first ring assembly and having at least one sealing lip coming into contact with the second sealing ring of the second ring assembly, the sealing lips of the second and third seal elements delimiting between the first and second sealing rings a second chamber, and at least a second purging channel extends through the second ring assembly and comprises at least one inlet orifice opening into the second chamber and at least one outlet orifice opening on a surface of the second ring assembly which is accessible from outside the rolling-element bearing. The second purging channel is distinct from the first purging channel.

In one embodiment, the second purging channel extends through the second sealing ring and the second rolling ring, and the surface onto which the outlet orifice of the first purging channel opens is located on the second rolling ring.

Alternatively, the second purging channel may be provided only through the second sealing ring of the second ring assembly.

In one embodiment, the rolling-element bearing further comprises at least one closing element removably attached at the outlet orifice of the second purging channel. Preferably, this closing element is made of transparent material. This closing element may be a plug. Alternatively, the closing element may be a collector to collect fluid.

In one embodiment, the rolling-element bearing further comprises at least first and second successive sealing members axially interposed between the second rolling ring and the second sealing ring of the second ring assembly, and at least one first leakage test channel extends through the second rolling ring or through the second sealing ring and comprises at least one inlet orifice opening on a frontal surface of the second rolling ring or the second sealing ring in a zone located radially between the first and second successive sealing members and at least one outlet orifice opening on a surface of the second rolling ring or the second sealing ring that is accessible from the outside of the rolling-element bearing.

The rolling-element bearing may further comprise at least one closing element removably attached at the outlet orifice of the first leakage test channel. Preferably, this closing element is made of transparent material. This closing element may be a plug. Alternatively, the closing element may be a collector to collect fluid.

In one embodiment, the rolling-element bearing further comprises at least a first seal member axially interposed between the first rolling ring and the first sealing ring of the first ring assembly and radially offset with respect to the first seal element, and at least one second leakage test channel extends through the first rolling ring or through the first sealing ring, and comprises at least one inlet orifice opening on a frontal surface of the first rolling ring or the first sealing ring in a zone located radially between the first seal member and the first seal element and at least one outlet orifice opening on a surface of the first rolling ring, or of the first sealing ring, which is accessible from the outside of the rolling-element bearing. The rolling-element bearing may further comprise at least one closing element removably attached at the outlet orifice of the second leakage test channel. Preferably, this closing element is made of transparent material. This closing element may be a plug. Alternatively, the closing element may be a collector to collect fluid.

In one embodiment, the first sealing ring of the first ring assembly is formed as a split ring and comprises at least a first part ring (ring section) and a second part ring (ring section) that are stacked axially, the first and second successive seal elements being respectively supported by the first and second part rings, the first seal member being axially interposed between the first rolling ring and the first part ring of the first sealing ring of the first ring assembly. The second leakage test channel may extend axially through the first and second part rings of the first sealing ring.

In one embodiment, the rolling-element bearing further comprises, axially on each side of the first and second rolling rings of the first and second ring assemblies, seal elements delimiting radially between the first and second rolling rings a closed rolling space inside which is housed the row of rolling elements, the seal elements being distinct from the first and second successive seal elements.

In one embodiment, the first ring assembly is the inner ring and the second ring assembly is the outer ring. Alternatively, the first ring assembly is the outer ring and the second ring assembly is the inner ring.

BRIEF DESCRIPTION OF THE DRAWINGS

The present disclosure and its advantages will be better understood by studying the detailed description of specific embodiments given by way of non-limiting examples and illustrated by the appended drawings on which.

DETAILED DESCRIPTION

Figure 1:
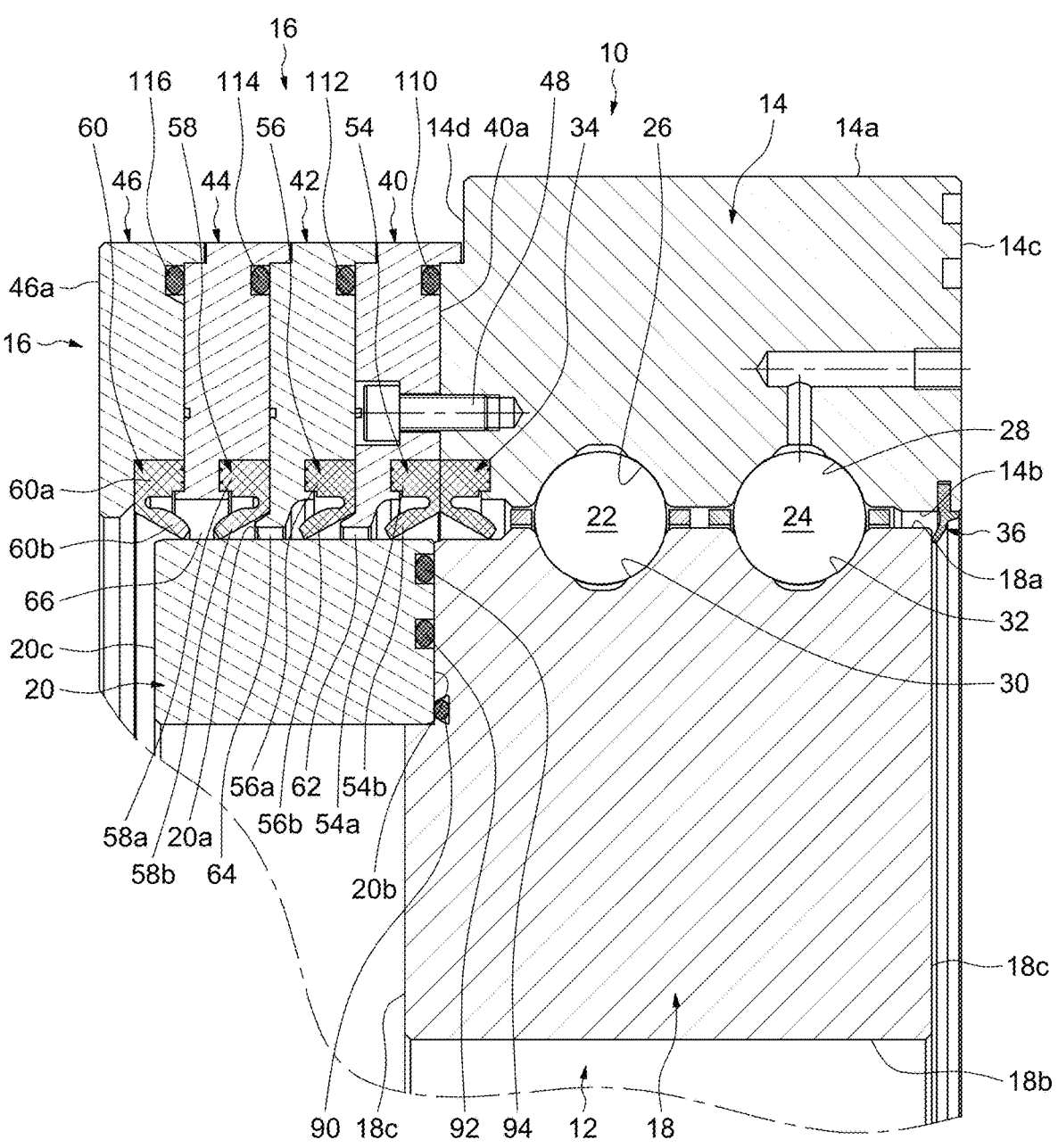
FIG. 1 is a cross-sectional view of a rolling-element bearing according to a first embodiment of the present disclosure.

The rolling-element bearing illustrated in FIG. 1 is a large-diameter rolling-element bearing comprising a first ring assembly 10 and a second ring assembly 12. In the illustrated example, the first ring assembly 10 is the outer ring and the second ring assembly 12 is the inner ring. The rolling-element bearing may be used in a tidal or marine turbine power station, a tunnel boring machine, a wind turbine, a big offshore crane or any other applications wherein a large diameter rolling-element bearing is required.

The outer and inner rings 10, 12 are concentric and extend axially along the bearing rotation axis (not shown) which runs in an axial direction. In this illustrated example, the rings 10, 12 are of the solid type.

The outer ring 10 comprises a rolling ring 14 and a sealing ring 16 secured to the rolling ring 14. The inner ring 12 also comprises a rolling ring 18 and a sealing ring 20 secured to the rolling ring 18. The sealing ring 16 of the outer ring radially surrounds the sealing ring 20 of the inner ring.

As will be described later, a plurality of successive seal elements are radially provided between the sealing rings 16, 20.

In the illustrated example, the rolling-element bearing also comprises two rows of balls 22, 24 which are arranged between first raceways 26, 28 of the rolling ring 14 of the outer ring and second raceways 30, 32 of the rolling ring 18 of the inner ring.

The rolling ring 18 of the inner ring comprises an outer cylindrical surface 18*a* from which the raceways 30, 32 are formed. The raceways 30, 32 are oriented radially outwards. The rolling ring 18 also comprises an inner cylindrical surface or bore 18*b* which is radially opposite the outer surface 18*a*. The rolling ring 18 further comprises two opposite first and second frontal surfaces 18*c*, 18*d* which axially delimit the outer surface 18*a* and the bore 18*b*. The frontal surfaces 18*c*, 18*d* delimit the axial thickness of the rolling ring 18.

The rolling ring 14 of the outer ring comprises an outer cylindrical surface 14*a* and an inner cylindrical bore 14*b* which is radially opposite the outer surface 14*a* and from which the raceways 26, 28 are formed. The raceways 26, 28 are oriented radially inwards. The rolling ring 14 further comprises two opposite first and second frontal surfaces 14*c*, 14*d* which axially delimit the outer surface 14*a* and the bore 14*b*. The frontal surfaces 14*c*, 14*d* delimit the axial thickness of the rolling ring 14.

The rolling-element bearing further comprises, axially on each side of the rolling rings 14 and 18, an annular seal element 34, 36 mounted on the rolling ring 14 and provided to close the radial space that exists between the rolling rings 14, 18. This radial space is defined between the bore 14*b* of the rolling ring 14 and the outer surface 18*a* of the rolling ring 18. An annular closed rolling space (not referenced) is defined between the rolling rings 14, 18 and the seal elements 34, 36 in which the rows of balls 22, 24 are housed. Advantageously, the rolling space is filled with lubricant.

Each seal element 34, 36 is mounted in a groove (not referenced) formed on the cylindrical bore 14*b* of the rolling ring 14 and comes into contact with the rolling ring 18. The seal element 34 comes into contact with the outer surface 18*a* of the rolling ring 18. The seal element 36 comes into contact with the frontal surface 18*c* of the rolling ring 18. Alternatively, it could be possible to provide a reversed arrangement for at least one of the seal elements 34, 36 with the seal mounted on the rolling ring 18 and coming into friction contact with the rolling ring 14.

The sealing ring 16 of the outer ring is mounted axially in contact against the frontal surface 14*d* of the rolling ring 14. The sealing ring 16 protrudes axially with regard to the rolling ring 14. The sealing ring 16 is removably attached or secured to the rolling ring 14. The sealing ring 16 radially surrounds the sealing ring 20 of the inner ring. Each of the sealing rings 16, 20 may be made of stainless steel or treated steel with a painting or anti-corrosion treatment.

In the illustrated example, the sealing ring 16 is formed as a split (multi-part) ring and comprises first, second, third and fourth part rings 40, 42, 44, 46 (ring sections) stacked one relative to the other in the axial direction. Alternatively, the sealing ring 16 may be made in one part.

The first part ring 40 is removably secured to the rolling ring 14 by screws 48 spaced apart in the circumferential direction. The first part ring 40 axially abuts against the frontal surface 14*d* of the rolling ring 14. Similarly, the second part ring 42 is removably secured to the first part ring 40 by screws (not shown) axially on the side opposite the rolling ring 14. The third part ring 44 is removably secured to the second part ring 42 by screws 50 (FIGS. 2 and 5) on the side axially opposite the first part ring 40. The fourth part ring 46 is removably secured to the third part ring 44 by screws 52 (FIG. 6) on the side axially opposite the second part ring 42. The heads of the screws of the first part ring 40 may be covered by potting material and embedded inside this material. Hence, the associated threads of the screws are sealed.

As previously mentioned, a plurality of successive annular seal elements are provided radially between the sealing ring 16 of the outer ring and the sealing ring 20 of the inner ring.

In the illustrated example, the rolling-element bearing is provided with first, second, third and fourth successive seal elements 54, 56, 58 60 supported by the sealing ring 16 of the outer ring. The sealing ring 16 bears the seal elements 54, 56, 58, 60. The seal elements 54, 56, 58, 60 are arranged successively in the axial direction.

The first, second, third and fourth successive seal elements 54, 56, 58, 60 are respectively mounted on the first, second, third and fourth part rings 40, 42, 44, 46 of the sealing ring. Hence, the first seal element 54 axially contacts the side of the rolling ring 14, the fourth seal element 60 axially contacts the exterior side of the rolling-element bearing, and the second and third seal elements 56, 58 are axially disposed between these two seal elements. The second seal element 56 is locally axially inward relative to the third and fourth seal elements 58, 60. The first seal element 54 is locally axially inward with respect to the second seal element 56.

Each seal element 54, 56, 58, 60 includes an annular heel 54*a*, 56*a*, 58*a*, 60*a* and an annular friction lip 54*b*, 56*b*, 58*b*, 60*b* projecting from the heel. In the illustrated example, each friction lip 54*b*, 56*b*, 58*b*, 60*b* extends inwardly from the respective heel 54*a*, 56*a*, 58*a*, 60*a*. Here, each friction lip 54*b*, 56*b*, 58*b*, 60*b* extends obliquely. In the illustrated example, the lips 54*b*, 56*b*, 58*b* extend obliquely outwards while the lip 60*b* extends obliquely inwards.

The heel 54*a*, 56*a*, 58*a*, 60*a* of each seal element is mounted in axial and radial contact against the associated first, second, third and fourth part ring 40, 42, 44, 46 of the sealing ring. Here, the heel 54*a* of the first seal element also abuts axially against the seal element 34.

Each lip 54*b*, 56*b*, 58*b*, 60*b* comes into frictional contact with the sealing ring 20 of the inner ring. The lips 54*b*, 56*b*, 58*b*, 60*b* come into frictional contact with the outer surface of the sealing ring 20. The contact between each lip 54*b*, 56*b*, 58*b*, 60*b* and the sealing ring 20 is radial. The lips 54*b*, 56*b*, 58*b*, 60*b* are flexible in the radial direction. Preferably, the free end of each lip has a triangular shape in cross-section in order to reduce friction.

In the illustrated example, the seal elements 54, 56, 58, 60 are identical to each other. Alternatively, the seal elements 54, 56, 58, 60 may be different from one another. In the illustrated example, the rolling-element bearing comprises four seal elements 54, 56, 58, 60. The number of seal elements may be different. For example, the rolling-element bearing may comprise at least two seal elements. The seal elements 54, 56, 58, 60 may be made of elastomeric material, for example polyurethane.

The sealing lips 54*b*, 56*b* of the first and second seal elements 54, 56 delimit a first chamber 62 between the sealing ring 16 of the outer ring and the sealing ring 20 of the inner ring.

Similarly, the sealing lips 56*b*, 58*b* of the second and third seal elements 56, 58 delimit a second chamber 64 between the sealing rings 16, 20. The second chamber 64 is offset axially outward with respect to the first chamber 62. The sealing lips 58*b*, 60*b* of the third and fourth seals 58, 60 delimit a third chamber 66 between the sealing rings 16, 20. The third chamber 66 is offset axially outward with respect to the second chamber 64. The chamber 64 is located axially between the first and second chambers 62, 66. The first, second and third chambers 62, 64, 66 are axially successive.

Figure 6:
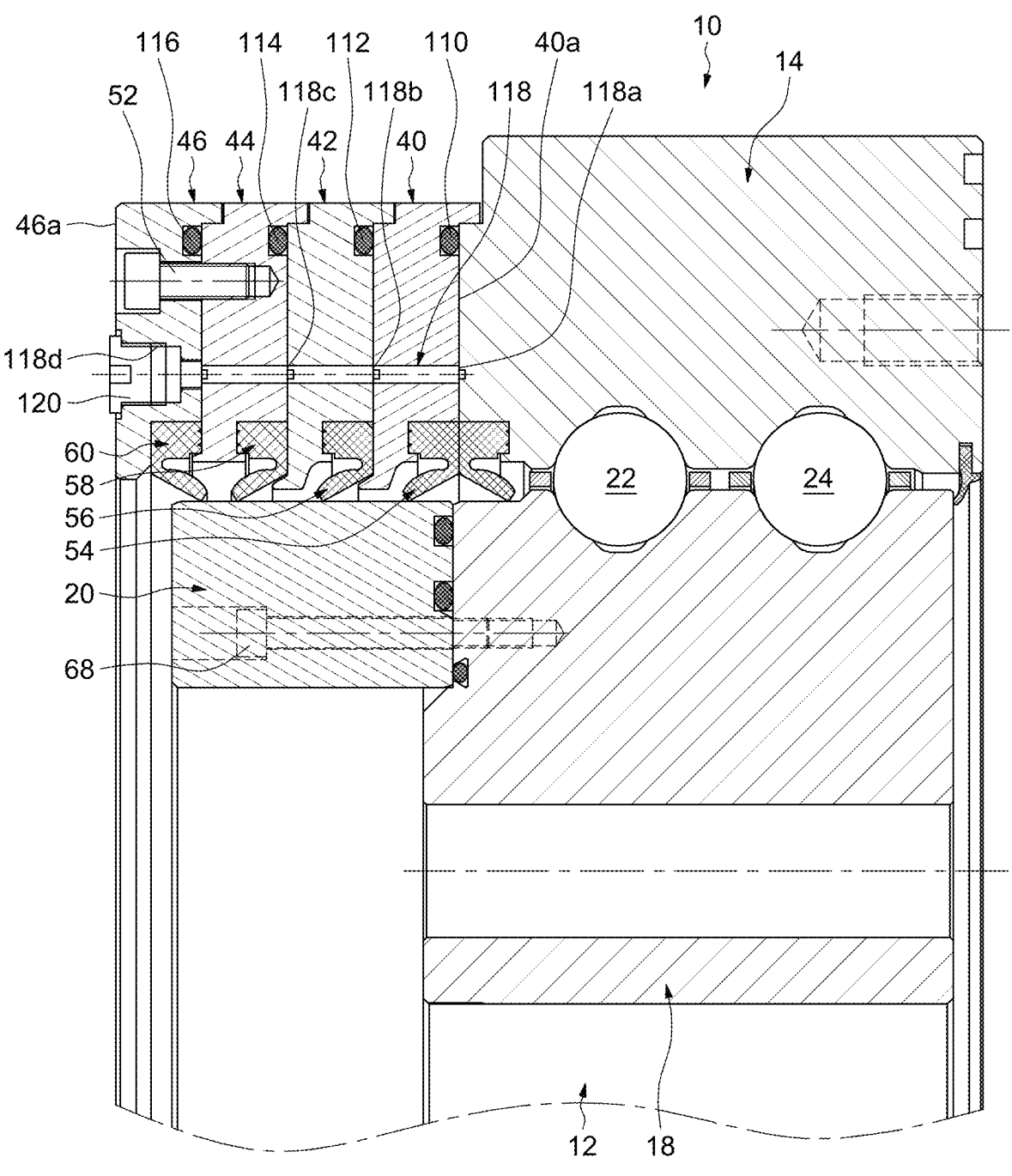

The sealing ring 20 of the inner ring is removably attached or secured to the rolling ring 18 by screws 68 (FIG. 6). The heads of the screws 68 may be covered by potting material and embedded inside this material. Hence, the associated threads of the screws 68 are sealed. The sealing ring 20 is mounted axially in contact against the frontal surface 18*c* of the rolling ring 18. The sealing ring 20 protrudes axially with regard to the rolling ring 18.

The sealing ring 20 comprises an outer cylindrical surface 20*a* and an inner cylindrical surface or bore (not referenced) which is radially opposite the outer surface 20, and two opposite first and second frontal surfaces 20*b*, 20*c* which axially delimit the outer surface 20*a* and the bore. The frontal surfaces 20*b*, 20*c* delimit the axial thickness of the sealing ring 20. The frontal surface 20*b* of the sealing ring is mounted in axially contact with the frontal surface 18*c* of the rolling ring 18. The friction lips 54*b*, 56*b*, 58*b*, 60*b* of the first, second, third and fourth successive seal elements 54, 56, 58, 60 come into friction contact with the outer surface 20*a* of the sealing ring.

Figure 2:
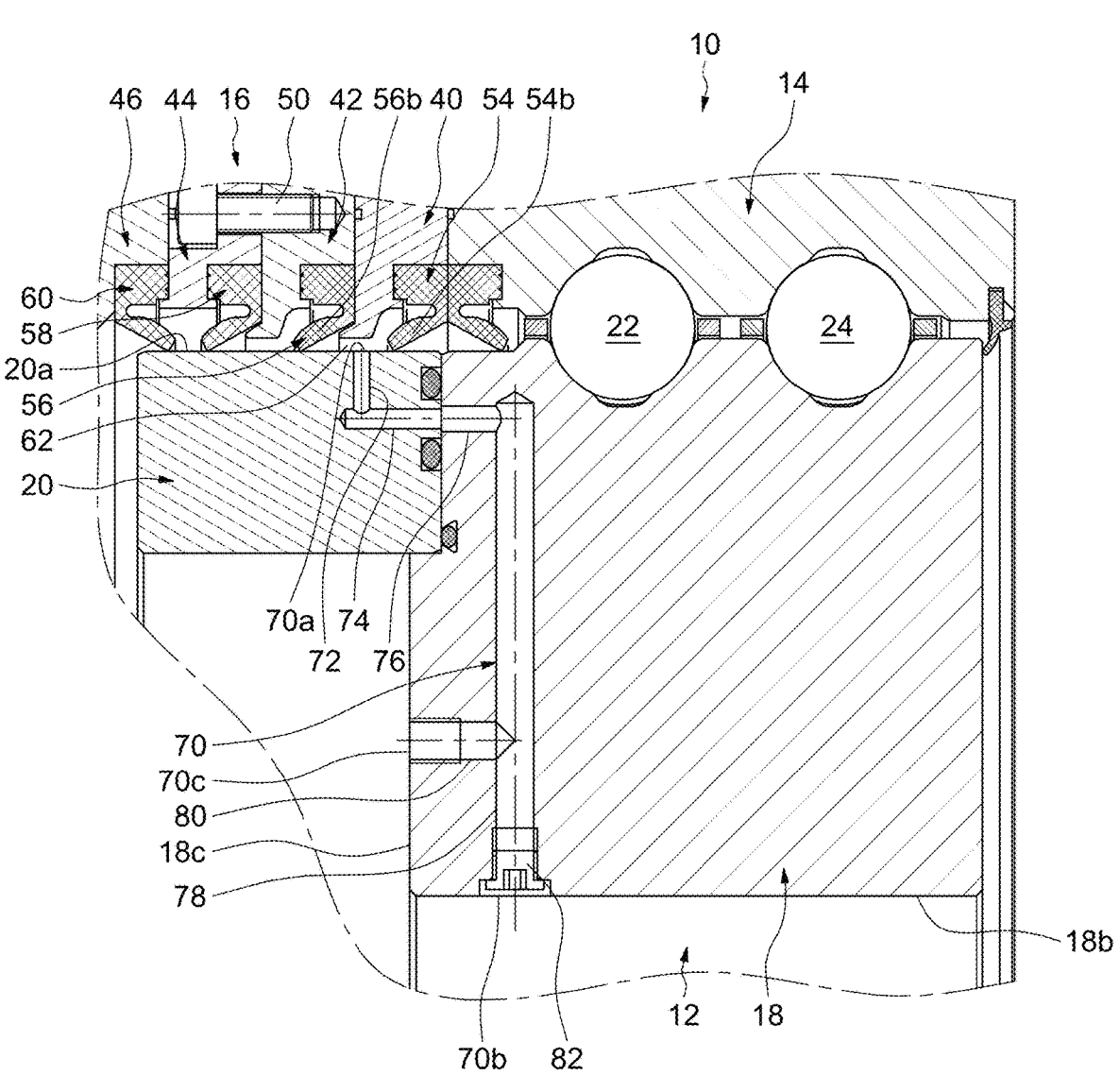
FIGS. 2 to 4 are cross-sectional views of the rolling-element bearing of FIG. 1 taken along various different cutting planes.

As shown on FIG. 2, the rolling-element bearing comprises a first purging channel 70 that extends through the inner ring 12 and is in fluidic communication with the first chamber 62 delimited by the sealing lips 54*b*, 56*b* of the first and second seal elements 54, 56. During operation, the purging channel 70 enables any fluid that leaks into the sealed chamber 62 to be evacuated. Prior to operation, the purging channel 70 may be used to introduce lubricant, preferably grease, into the chamber 62. Such lubricant forms an additional barrier against the ingress of contaminants.

In the illustrated example, the purging channel 70 is provided in the sealing ring 20 and the rolling ring 18 of the inner ring. The purging channel 70 has an inlet orifice 70*a* opening into the first chamber 62. The inlet orifice 70*a* opens on the outer surface of the sealing ring 20 axially between the sealing lips 54*b*, 56*b* of the first and second seal elements 54, 56.

The purging channel 70 also has a first outlet orifice 70*b* at the opposite end of the purging channel 70 from the inlet orifice 70*a* and opening on the bore 18*b* of the rolling ring 18 which is accessible from outside the rolling-element bearing. In the illustrated example, the purging channel 70 further includes a second outlet orifice 70*c* opening on the frontal surface 18*c* of the rolling ring 18 which is accessible from the outside of the rolling-element bearing. Alternatively, the purging channel 70 may have only the outlet orifice 70*b* or 70*c*.

The purging channel 70 is formed from several holes or bores in the thickness of the sealing ring 20 and the rolling ring 18. The purging channel 70 comprises a radial first hole 72 extending from the inlet orifice 70*a* and a axial second hole 74 connected to the first radial hole 72, the holes being both formed in the sealing ring 20. Alternatively, the purging channel 70 may comprise several radial holes 72 each extending from an inlet orifice 70*a* opening into the first chamber 62 and each connected to the axial second hole 74. In this case, the radial holes 72 are spaced apart in the circumferential direction.

The purging channel 70 also comprises a axial third hole 76, a radial fourth hole 78 and an axial fifth hole 80 both formed in the rolling ring 18. The axial third hole 76 axially faces the axial second hole 74, the radial fourth hole 78 is connected to the axial third hole 76 and extends from the outlet orifice 70*b*, and the axial fifth hole 80 is connected to the radial fourth hole 78 and connected to the outlet orifice 70*c*.

The rolling-element bearing also comprises a first closing plug 82 attached at the outlet orifice 70*b* of the purging channel 70. The closing plug 82 may be attached to the outlet orifice 70*b* by any appropriate means, for example by screwing. Preferably, the closing plug 82 is made of transparent material in order to be able to allow the visual detection of contaminant fluid during an inspection of the rolling-element bearing. In the illustrated example, the closing plug 82 does not protrude radially with respect to the bore 18*b* of the rolling ring. The closing plug 82 may be covered by potting material and embedded inside this material. Hence, the associated thread of the closing plug 82 is sealed.

As previously mentioned, in the illustrated example, the purging channel 70 also includes the second outlet orifice

70*c*. The rolling-element bearing may be provided with a plug or with a sensor (not illustrated) mounted at the outlet orifice 70*c* to detect water.

Figure 3:
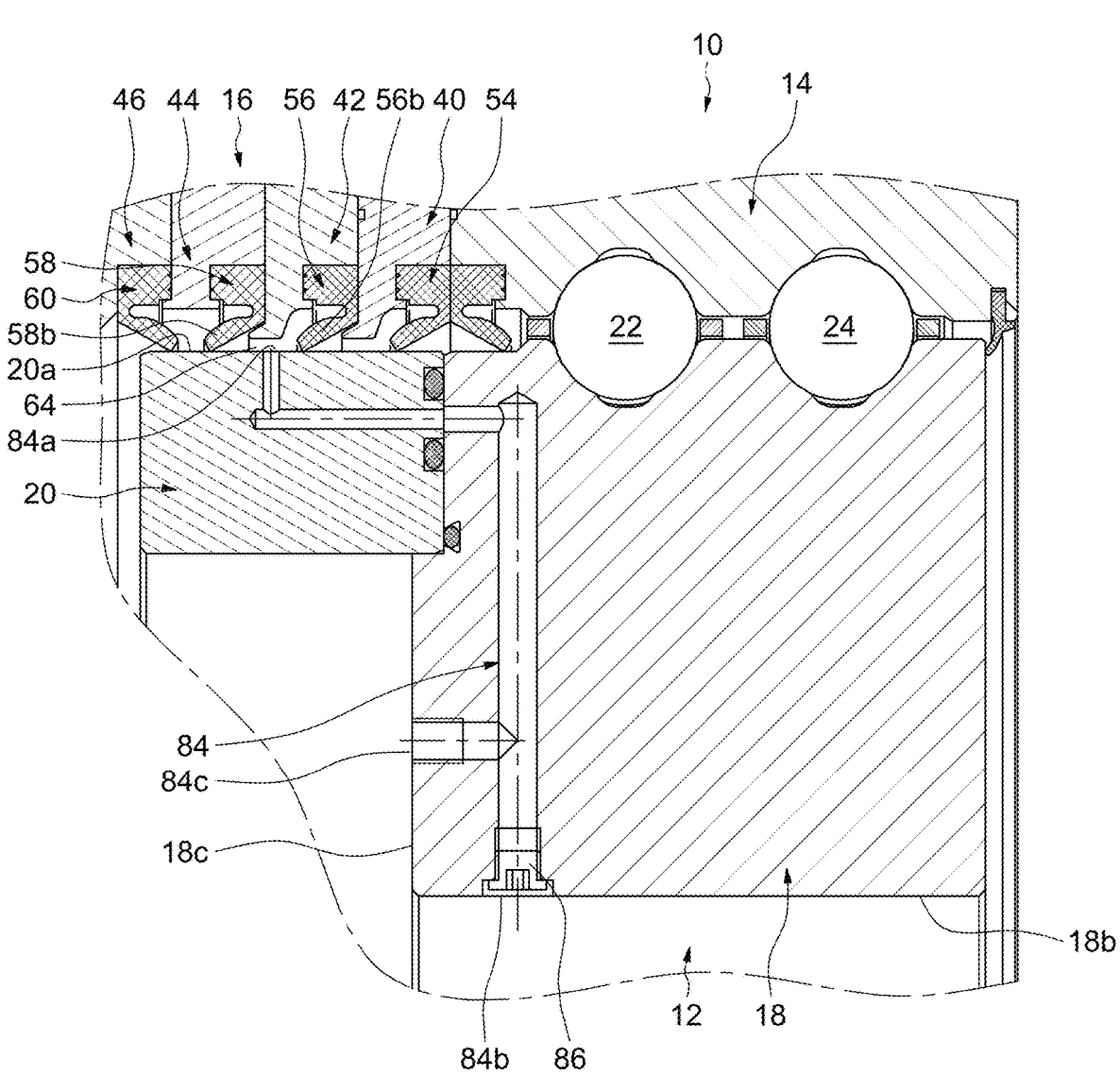

As shown on FIG. 3, the rolling-element bearing comprises a second purging channel 84 in the inner ring 12 and in fluidic communication with the second chamber 64 delimited by the sealing lips 56*b*, 58*b* of the second and third seal elements 56, 58. In operation, the purging channel 84 enables any fluid that leaks into the sealed chamber 64 to be evacuated. Prior to operation, the purging channel 84 may be used to introduce lubricant, preferably grease, into the chamber 64. Such lubricant forms an additional barrier against the ingress of contaminants.

In the illustrated example, the purging channel 84 extends through the sealing ring 20 and the rolling ring 18 of the inner ring. The purging channel 84 has an inlet orifice 84*a* opening into the second chamber 64. The inlet orifice 84*a* opens on the outer surface of the sealing ring 20 axially between the sealing lips 56*b*, 58*b* of the second and third seal elements 56, 58.

The purging channel 84 has a first outlet orifice 84*b* at the end of the channel opposite the inlet orifice 84*a* and opening on the bore 18*b* of the rolling ring 18. In the illustrated example, the purging channel 84 is also has a second outlet orifice 84*c* opening on the frontal surface 18*c* of the rolling ring 18. Alternatively, the purging channel 84 may have only the outlet orifice 84*b* or the outlet orifice 84*c*.

Similarly to the purging channel 70, the purging channel 84 is made of several holes or bores in the sealing ring 20 and the rolling ring 18. The purging channel 84 is circumferentially offset from the purging channel 70.

The rolling-element bearing also comprises a second closing plug 86 attached at the outlet orifice 84*b* of the purging channel. The closing plug 86 may be attached to the outlet orifice 84*b* by any appropriate means, for example by screwing. Preferably, the closing plug 86 is made of transparent material in order to be able to visually detect the presence of contaminant fluid during an inspection of the rolling-element bearing. In the illustrated example, the closing plug 86 does not radially protrude with respect to the bore 18*b* of the rolling ring. The closing plug 86 may be covered by potting material and embedded inside this material. Hence, the associated thread of the closing plug 86 is sealed.

As previously mentioned, in the illustrated example, the purging channel 84 also has the second outlet orifice 84*c*. The rolling-element bearing may be provided with a plug or with a sensor (not illustrated) mounted at the outlet orifice 84*c* to detect water.

Figure 4:
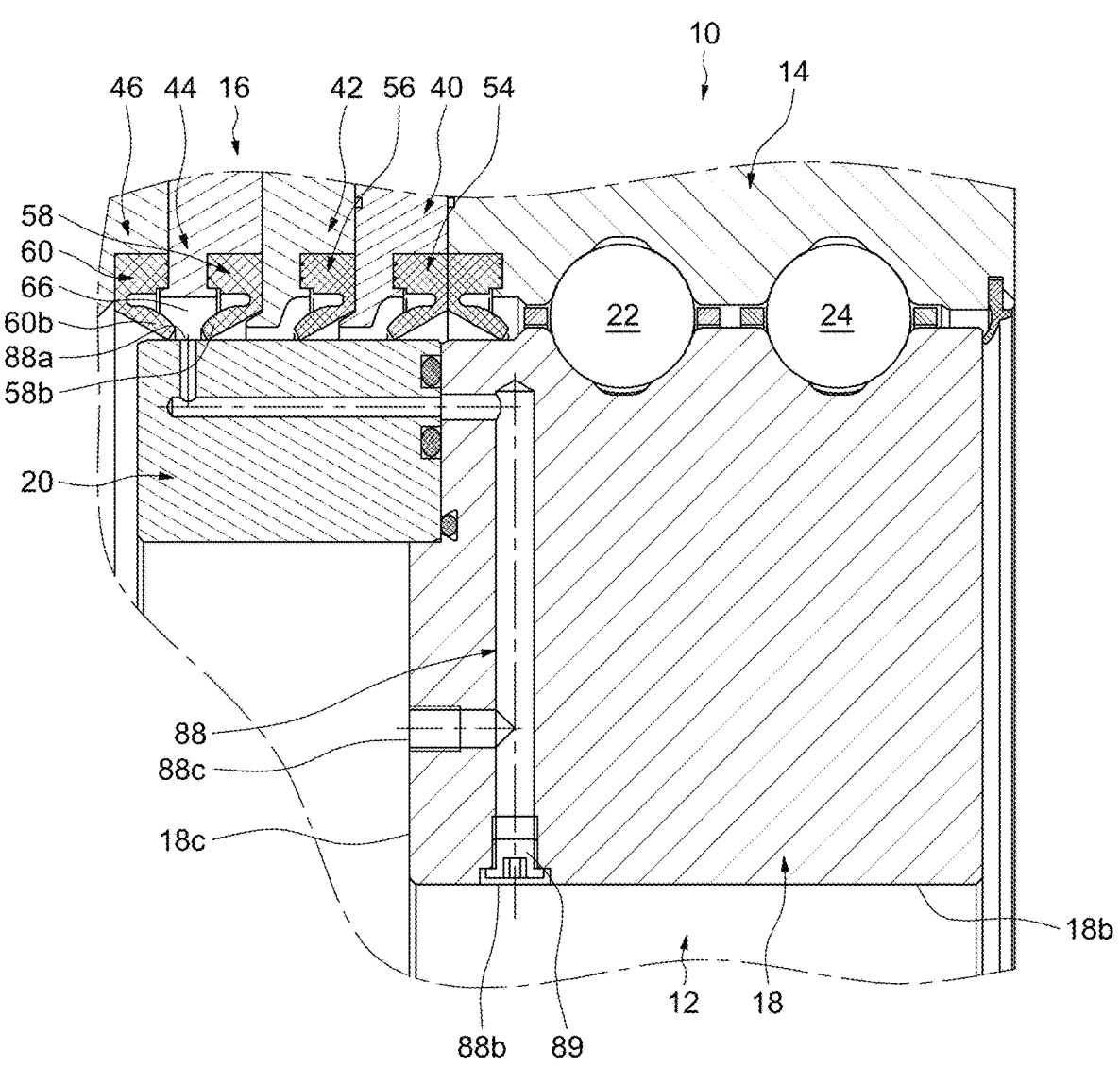

As shown on FIG. 4, the rolling-element bearing comprises a third purging channel 88 in the inner ring 12 and in fluidic communication with the third chamber 66 delimited by the sealing lips 58*b*, 60*b* of the third and fourth seal elements 58, 60. In operation, the purging channel 88 enables any fluid which leaks into the sealed chamber 66 to be evacuated. Prior to operation, the purging channel 88 may be used to introduce lubricant, preferably grease, into the chamber 66. Such lubricant forms an additional barrier against the ingress of contaminants. In a preferred embodiment, lubricant is provided only inside the first and second chambers 62, 64. In such case, the aim of the third purging channel 88 is only to evacuate any fluid which enters inside the third chamber 66.

In the illustrated example, the purging channel 88 extends through the sealing ring 20 and the rolling ring 18 of the inner ring. The purging channel 88 has an inlet orifice 88*a* opening into the third chamber 66. The inlet orifice 88*a* opens on the outer surface of the sealing ring 20 axially between the sealing lips 58b, 60b of the third and fourth seal elements.

The purging channel 88 also has a first outlet orifice 88b at an end of the purging channel 88 opposite the inlet orifice 88a and opening on the bore 18b of the rolling ring 18. In the illustrated example, the purging channel 88 is further includes a second outlet orifice 88c opening on the frontal surface 18c of the rolling ring 18. Alternatively, the purging channel 84 may be provided only with the outlet orifice 88b or the outlet orifice 88c.

Similarly to the purging channels 70 and 84, the purging channel 88 is made of several holes or bores in the sealing ring 20 and the rolling ring 18. The purging channel 88 is circumferentially offset from the purging channels 70, 84.

In the illustrated example, the purging channels 70, 84 and 88 are distinct from each other. Alternatively, some holes may be shared by at least two of these purging channels, namely the axial hole 76 and radial hole 78.

In the illustrated example, each of the purging channels 70, 84 and 88 extends through the sealing ring 20 and the rolling ring 18 of the inner ring. Alternatively, at least one these purging channels 70, 84 and 88 may be provided only through the sealing ring 20.

The rolling-element bearing also comprises a third closing plug 89 attached at the outlet orifice 88b of the purging channel. The closing plug 89 may be attached to the outlet orifice 88b by any appropriate means, for example by screwing. Preferably, the closing plug 89 is made of transparent material in order to be able to visually detect the presence of contaminant fluid during an inspection of the rolling-element bearing. In the illustrated example, the closing plug 89 does not radially protrude with respect to the bore 18b of the rolling ring. The closing plug 89 may be recovered by potting material and embedded inside this material. Hence, the associated thread of the closing plug 89 is sealed.

As previously mentioned, in the illustrated example, the purging channel 88 is also provided with the second outlet orifice 88c. The rolling-element bearing may be provided with a plug or with a sensor (not illustrated) mounted at the outlet orifice 88c to detect water.

Figure 5:
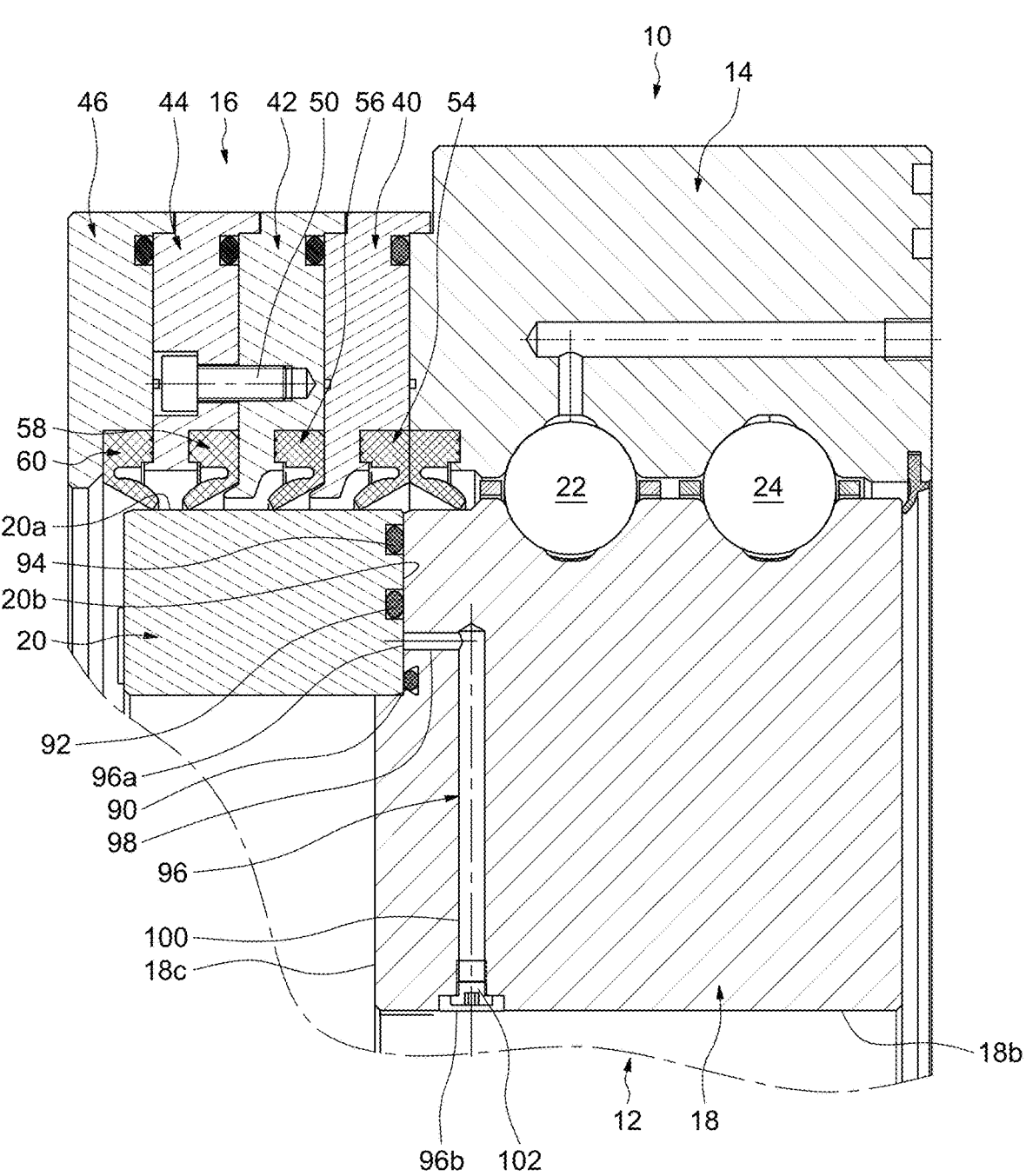
FIGS. 5 to 7 are cross-section views of the rolling-element bearing of FIG. 1 taken along still other cutting planes.

As shown notably on FIGS. 1 and 5, in the illustrated example, the rolling-element bearing further includes first, second and third successive annular sealing members 90, 92, 94 axially interposed between the rolling ring 18 and the sealing ring 20 of the inner ring. The sealing members 90, 92, 94 are arranged successively in the radial direction.

The sealing members 90, 92, 94 are axially interposed between the frontal surface 18c of the rolling ring 18 and the frontal surface 20b of sealing ring. Here, the rolling ring 18 supports the first sealing member 90 and the sealing ring 20 supports the second and third sealing members 92, 94. Alternatively, it could be possible to foresee a reversed arrangement of the sealing members 90, 92, 94 on the rolling and sealing rings 18, 20. Grooves (not referenced) are provided on the frontal surfaces 18c, 20b to receive the sealing members 90, 92, 94. In the illustrated example, the sealing members 90, 92, 94 have in cross-section a circular shape. Alternatively, the sealing members 90, 92, 94 may have other shapes.

The sealing member 90 is radially offset inward with respect to the sealing member 92, and the sealing member 92 is radially offset inward with respect to the sealing member 74.

In the illustrated example, the rolling-element bearing comprises three sealing members 90, 92, 94. The number of sealing members may be different. For example, the rolling-element bearing may comprise only the two sealing members 90 and 92. The sealing members 90, 92, 94 may be made of elastomeric material, for example polyurethane.

The rolling-element bearing further comprises a first leakage test channel 96 (e.g., FIG. 5) in the inner ring 12. In the illustrated example, the leakage test channel 96 extends through the rolling ring 18 of the inner ring.

The leakage test channel 96 has an inlet orifice 96a opening on the frontal surface 18c of the rolling ring in a zone located radially between the sealing members 90, 92. The leakage test channel 96 has an outlet orifice 96b opposite the inlet orifice 96a and opening on the bore 18b of the rolling ring which is accessible from the outside of the rolling-element bearing.

Prior to use of the rolling-element bearing, the leakage test channel 96 enables a fluid to be introduced radially between the sealing members 90, 92 at the junction of the frontal surface 18c of the rolling ring and the frontal surface 20b of the sealing ring. Hence, the effectiveness of the sealing members 90, 92 may be tested. The introduced fluid may be compressed air, lubricant, colored liquid, etc.

In use, the leakage test channel 96 enables the fluid any fluid which enter into the zone located radially between the sealing members 90, 92 at the junction of the frontal surface 18c of the rolling ring and the frontal surface 20b of the sealing ring to be evacuated.

The leakage test channel 96 includes several holes or bores in the rolling ring 18. The leakage test channel 96 comprises an axial first hole 98 extending from the inlet orifice 96a and a radial second hole 100 connected to the radial first hole 98 and extending to the outlet orifice 96b, the holes being both formed in the thickness of the rolling ring 18.

The rolling-element bearing also comprises a fourth closing plug 102 attached at the outlet orifice 96b of the leakage test channel. The closing plug 102 may be attached to the outlet orifice 96b by any appropriate means, for example by screwing. Preferably, the closing plug 102 is made of transparent material in order to allow visual detection of the presence of contaminant fluid during an inspection of the rolling-element bearing. In the illustrated example, the closing plug 102 does not protrude radially with respect to the bore 18b of the rolling ring. The closing plug 102 may be covered by potting material and embedded inside this material. Hence, the associated thread of the closing plug 102 is sealed.

Figure 8:
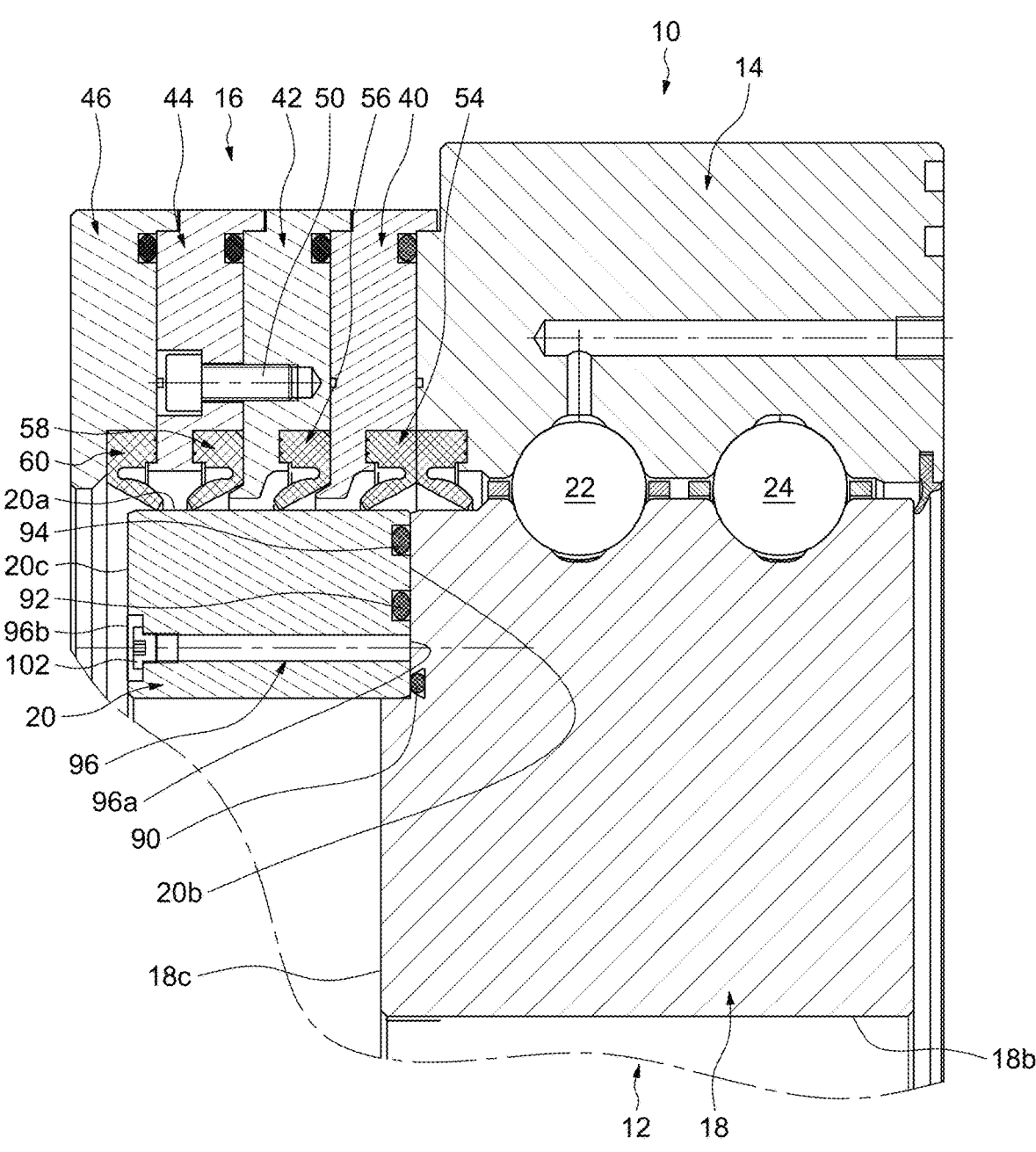
FIG. 8 is a cross-sectional view of a rolling-element bearing according to a second embodiment of the present disclosure.

As previously mentioned, in the illustrated example, the leakage test channel 96 is located in the rolling ring 18 of the inner ring. Alternatively, as shown on FIG. 8, the first leakage test channel 96 may be located in the sealing ring 20.

In this alternative embodiment, the inlet orifice 96a of the leakage test channel 96 opens on the frontal surface 20b of the sealing ring and the outlet orifice 96b opens on the opposite frontal surface 20c which is accessible from the outside of the rolling-element bearing. The leakage test channel 96 is here made of one single hole in the sealing ring 20.

Referring once again to FIGS. 1 and 6, in the first illustrated example, the rolling-element bearing further includes a first seal member 110 axially interposed between the first part ring 40 of the sealing ring and the rolling ring 14 of the outer ring. The seal member 110 is axially interposed between the frontal surface 14d of the rolling ring and the frontal surface 40a of the first part ring 40 axially bearing against this frontal surface 14d. A groove (not referenced) is provided on this frontal surface 40a of the first part ring 40. Hence, the first part ring 40 here bears the sealing member 110. Alternatively, the rolling ring 14 may bear the sealing member 110. The seal member 110 is offset radially outwards with respect to the first seal element 54. The seal member 110 radially surrounds the first seal element 54.

The rolling-element bearing also includes a second seal member 112 axially interposed between the first and second part rings 40, 42 of the sealing ring. The seal member 112 is axially interposed between the frontal surfaces of the first and second part rings 40, 42 in axial contact one against the other. A groove (not referenced) is provided on this frontal surface of the second part ring 42. Hence, the second part ring 42 here bears the sealing member 112. Alternatively, the first part ring 40 may bear the sealing member 112. The seal member 112 is radially offset outwards with respect to the second seal element 56. The seal member 112 radially surrounds the second seal element 56.

The rolling-element bearing is further provided with a third seal member 114 axially interposed between the second and third part rings 42, 44 of the sealing ring. The seal member 114 is axially interposed between the frontal surfaces of the second and third part rings 42, 44 in axial contact one against the other. A groove (not referenced) is provided on this frontal surface of the third part ring 44. Hence, the third part ring 44 here supports the sealing member 114. Alternatively, the second part ring 42 may support the sealing member 114. The seal member 114 is offset radially outward with respect to the third seal element 58. The seal member 114 radially surrounds the third seal element 58.

The rolling-element bearing further includes a fourth seal member 116 axially interposed between the third and fourth part rings 44, 46 of the sealing ring. The seal member 116 is axially interposed between the frontal surfaces of the third and fourth part rings 44, 46 in axial contact one against the other. A groove (not referenced) is provided on this frontal surface of the fourth part ring 46. Hence, the fourth part ring 46 here supports the sealing member 116. Alternatively, the third part ring 44 may support the sealing member 116. The seal member 116 is offset radially outward with respect to the fourth seal element 60. The seal member 116 radially surrounds the fourth seal element 60. The seal members 110 to 116 are aligned in the axial direction.

The rolling-element bearing includes a second leakage test channel 118 that extends through the sealing ring 16 of the outer ring. The leakage test channel 118 extends through the axial thickness of the sealing ring 16. The leakage test channel 118 extends axially through the first, second, third and fourth parts 40, 42, 44, 46 of the sealing ring 16. Alternatively, the leakage test channel 118 may be provided in the rolling ring 14.

The leakage test channel 118 includes a first inlet orifice 118a opening on the frontal surface 40a of the first part 40 of the sealing ring, which is in axial contact with the rolling ring 14, in a zone located radially between the sealing member 110 and the seal element 54.

The leakage test channel 118 also includes a second inlet orifice 118b opening on the frontal surface of the second part 42 of the sealing ring, which is in axial contact with the first part 40, in a zone located radially between the sealing member 112 and the seal element 56. The leakage test channel 96 further includes a third inlet orifice 118c opening on the frontal surface of the third part 44 of the sealing ring, which is in axial contact with the second part 42, in a zone located radially between the sealing member 114 and the seal element 58.

The leakage test channel 118 also includes an outlet orifice 118d opening on the frontal surface 46a of the fourth part 46 of the sealing ring which is oriented axially outwards and accessible from outside the rolling-element bearing. The frontal surface 46a is located axially on the side opposite the third part 44. The frontal surfaces 40a, 46a delimit the axial thickness of the sealing ring 16. The leakage test channel 118 is made of several axial aligned through-holes provided in the sealing ring 16. The inlet orifices 118a, 118b, 118c and the outlet orifice 118d are aligned in the axial direction.

Prior to use of the rolling-element bearing, the leakage test channel 118 enables a fluid to be introduced radially between the sealing member 110 and the seal element 54 at the junction of the rolling ring 14 and the first part 40, and radially between the sealing member 112 and the seal element 56 at the junction of the first and second parts 40 and 42, and radially between the sealing member 114 and the seal element 58 at the junction of the second and third parts 42 and 44, and radially between the sealing member 116 and the seal element 60 at the junction of the third and the fourth parts 44, 46. Hence, the effectiveness of the sealing members 110 to 116 and the seal elements 54, 56, 58, 60 may be tested. The introduced fluid may be compressed air, lubricant, colored liquid, etc..

In operation, the leakage test channel 118 enables the evacuation of any fluid that leaks into the zone located radially between the sealing member 110 and the seal element 54 at the junction of the rolling ring 14 and the first part 40, and into the zone located radially between the sealing member 112 and the seal element 56 at the junction of the first and second parts 40 and 42, and in the zone located radially between the sealing member 114 and the seal element 58 at the junction of the second and third parts 42 and 44, and in the zone located radially between the sealing member 116 and the seal element 60 at the junction of the third and the fourth parts 44, 46.

The rolling-element bearing also comprises a fifth closing plug 120 attached at the outlet orifice 118b of the leakage test channel. The closing plug 120 may be attached to the outlet orifice 118b by any appropriate means, for example by screwing. Preferably, the closing plug 120 is made of transparent material in order to allow the visual detection of the presence of contaminant fluid during an inspection of the rolling-element bearing. In the illustrated example, the closing plug 120 axially protrudes with respect to the frontal surface 46a of the fourth part 46 of the sealing ring. The closing plug 120 may be covered by potting material and embedded inside this material. Hence, the associated thread of the closing plug 120 is sealed.

Figure 7:
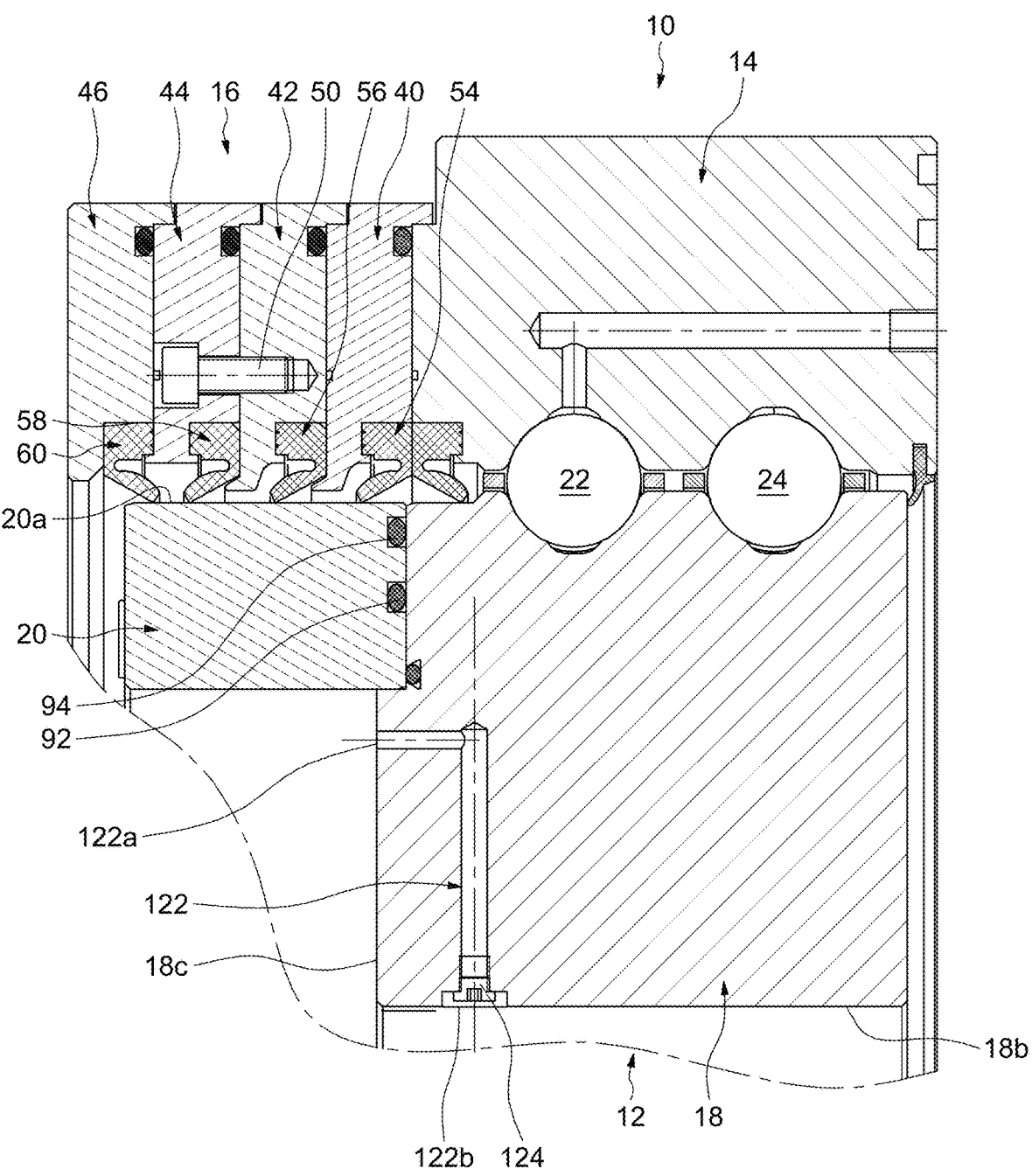

As shown on FIG. 7, in the illustrated example, the rolling-element bearing further comprises a third leakage test channel 122 in the rolling ring 18 of the inner ring The leakage test channel 122 has an inlet orifice 122a opening on the frontal surface 18c of the rolling ring in a zone offset radially inward with respect to the sealing ring 20. The leakage test channel 122 has an outlet orifice 122b opposite the inlet orifice 122a and opening on the bore 18b of the rolling ring. The leakage test channel 122 is formed from several holes or bores in the thickness of the rolling ring 18. The leakage test channel 122 comprises an axial first hole (not referenced) extending from the inlet orifice 122a and a radial second hole (not referenced) connected to the radial first hole and connected to the outlet orifice 122b, the holes being both formed in the thickness of the rolling ring 18.

The zone of the frontal surface 18c of the rolling ring onto which the inlet orifice 122a opens is intended to be in axial contact with a frame of an associated machine (not referenced) via two seals. The inlet orifice 122a is located radially between these two seals.

Prior to operation, the leakage test channel 112 enables a fluid to be introduced radially between these seals to test their effectiveness. The introduced fluid may be compressed air, lubricant, colored liquid, etc.

In operation, the leakage test channel 112 enables the evacuation of any fluid which leaks into the zone radially between these seals at the junction of the frontal surface 18c of the rolling ring and the frame of the associated machine.

The rolling-element bearing also comprises a fifth closing plug 124 attached at the outlet orifice 112b of the leakage test channel. The closing plug 124 may be attached to the outlet orifice 112b by any appropriate means, for example by screwing. Preferably, the closing plug 124 is made of transparent material in order to allow visual detection of the presence of contaminant fluid during an inspection. In the illustrated example, the closing plug 124 does not radially protrude with respect to the bore 18b of the rolling ring. The closing plug 124 may be covered by potting material and embedded inside this material. Hence, the associated thread of the closing plug 124 is sealed.

Alternatively, the first leakage test channel and/or the second leakage test channel and/or the third leakage test channel may be omitted from the rolling-element bearing.

Figure 9:
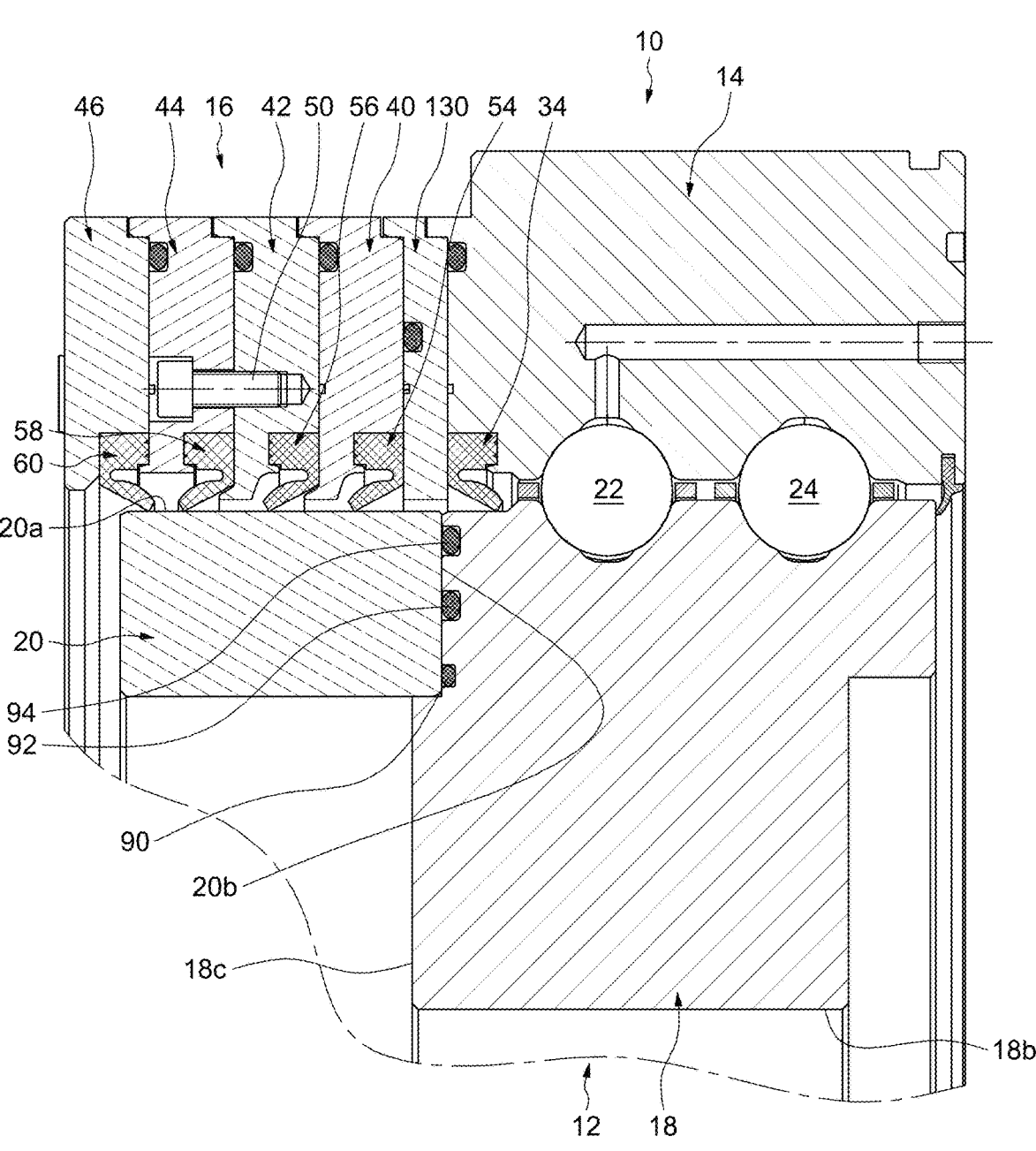
FIG. 9 is a cross-sectional view of a rolling-element bearing according to a third embodiment of the present disclosure.

The example shown on FIG. 9, in which identical parts are given identical references, differs from the first embodiment in that the sealing ring 16 of the outer ring further includes a spacer 130 interposed axially between the rolling ring 14 and the first part ring 40. Here, the first seal element 54 is axially spaced with respect the seal element 34. In this example, the axial length of the sealing ring 20 of the inner ring is increased.

The spacer 130 allows the sealing lips of the seal elements 54, 56, 58, 60 to adopt two different axial positions, namely the first one with this spacer and the second one with the spacer removed and the axial contact of the first part 40 directly against the rolling ring 14. By removing the spacer 130, the seal elements 54, 56, 58, 60 are axially displaced along the outer surface 20a of the sealing ring of the inner ring.

Otherwise, as previously mentioned, in the illustrated examples, the first ring assembly of the rolling-element bearing is the outer ring whereas the second ring assembly is the inner ring. As an alternative, a reversed arrangement could be provided in which the first ring assembly forms the inner ring and the second ring assembly forms the outer ring.

In the described examples, the rolling-element bearing comprises two rows of rolling elements. Alternatively, the rolling-element bearing may comprise only one row of rolling elements, or three or more rows of rolling elements. In the illustrated example, the rolling elements are balls. The rolling-element bearing may comprise other types of rolling elements, for example rollers.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved rolling-element bearings.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

What is claimed is:

1. A rolling-element bearing comprising:
a first ring assembly and a concentric second ring assembly mounted for rotation relative to the first ring assembly,
the first ring assembly comprising a first rolling ring having a raceway and a first sealing ring mounted axially to the first rolling ring at a first joint, the first sealing ring supporting a first seal element and a second seal element,
the second ring assembly comprising a second rolling ring having a raceway and a second sealing ring mounted axially to the second rolling ring at a second joint, and
a row of rolling elements between the raceway of the first rolling ring and the raceway of the second rolling ring,
wherein the first seal element includes a first lip in contact with the second sealing ring and the second seal element includes a second lip in contact with the second sealing ring, the first lip and the second lip delimiting a first chamber between the first sealing ring and the second sealing ring,
wherein a first purging channel extends from a first inlet orifice at the first chamber to at least one external surface of the second ring assembly, and
wherein no rolling elements contact the first sealing ring or the second sealing ring.

2. The rolling-element bearing according to claim 1, wherein the at least one external surface of the second ring assembly comprises at least one external surface of the second rolling ring.

3. The rolling-element bearing according to claim 2, further comprising at least one closing element removably attached at an outlet orifice of the first purging channel.

4. The rolling-element bearing according to claim 3, wherein the at least one closing element is transparent.

5. The rolling-element bearing according to claim 2, further comprising a third seal element supported by the first sealing ring and having a third lip in contact with the second sealing ring, the second lip and the third lip delimiting a second chamber between the first sealing ring and the second sealing ring, and
a second purging channel extending from a second inlet orifice at the second chamber to the at least one external surface of the second rolling ring.

6. The rolling-element bearing according to claim 2, further comprising:

a first sealing member axially interposed between the first rolling ring and the first sealing ring and radially offset from the first seal element, and at least one leakage test channel extending from a location between the first sealing member and the first seal element to an opening on an external surface of the first sealing ring.

7. The rolling-element bearing according to claim 2, further comprising a third seal element supported by the first sealing ring and having a third lip in contact with the second sealing ring, the second lip and the third lip delimiting a second chamber between the first sealing ring and the second sealing ring, wherein the first sealing ring comprise a first sealing ring section mounted axially against a first side of a second sealing ring section and a third sealing ring section mounted axially against a second side of the second sealing ring section, wherein the first seal element is supported by the first sealing ring section and the second seal element is supported by the second sealing ring section and the third seal element is supported by the third sealing ring section, and wherein a second purging channel extends from a second inlet orifice at the second chamber to at least one second outlet orifice in the at least one external surface of the second sealing ring.

8. The rolling-element bearing according to claim 1, further comprising:

first and second sealing members axially interposed between the second rolling ring and the second sealing ring, and a leakage test channel in the second sealing ring having a first opening radially between the first and second sealing members and a second opening in at least one external surface of the second sealing ring.

9. The rolling-element bearing according to claim 1, wherein the second sealing ring lies entirely on a first side of a radial plane and all rolling elements of the rolling-element bearing lie on a second side of the radial plane.

10. A rolling-element bearing comprising:

a first ring assembly and a concentric second ring assembly mounted for rotation relative to the first ring assembly, the first ring assembly comprising a first rolling ring having a raceway and a first sealing ring mounted axially to the first rolling ring at a first joint, the first sealing ring supporting a first seal element and a second seal element, the second ring assembly comprising a second rolling ring having a raceway and a second sealing ring mounted axially to the second rolling ring at a second joint, and a row of rolling elements between the raceway of the first rolling ring and the raceway of the second rolling ring, wherein the first seal element includes a first lip in contact with the second sealing ring and the second seal element includes a second lip in contact with the second sealing ring, the first lip and the second lip delimiting a first chamber between the first sealing ring and the second sealing ring, wherein a first purging channel extends from a first inlet orifice at the first chamber to at least one external surface of the second ring assembly, wherein the at least one external surface of the second ring assembly comprises at least one external surface of the second rolling ring, wherein the first sealing ring comprise a first sealing ring section mounted axially against a second sealing ring section, and wherein the first seal element is supported by the first sealing ring section and the second seal element is supported by the second sealing ring section.

11. The rolling-element bearing according to claim 10, wherein a leakage test channel extends axially through the first sealing ring section and the second sealing ring section.

12. A rolling-element bearing comprising:

a first ring assembly and a concentric second ring assembly mounted for rotation relative to the first ring assembly, the first ring assembly comprising a first rolling ring having a raceway and a first sealing ring mounted axially to the first rolling ring at a first joint, the first sealing ring supporting a first seal element and a second seal element, the second ring assembly comprising a second rolling ring having a raceway and a second sealing ring mounted axially to the second rolling ring at a second joint, a row of rolling elements between the raceway of the first rolling ring and the raceway of the second rolling ring, and a first rolling ring seal on a first axial side of the row of rolling elements and a second rolling ring seal on a second axial side of the row of rolling elements, wherein the first seal element includes a first lip in contact with the second sealing ring and the second seal element includes a second lip in contact with the second sealing ring, the first lip and the second lip delimiting a first chamber between the first sealing ring and the second sealing ring, and wherein a first purging channel extends from a first inlet orifice at the first chamber to at least one external surface of the second ring assembly.

13. The rolling-element bearing according to claim 12, wherein the at least one external surface of the second ring assembly comprises at least one external surface of the second rolling ring.

* * * * *